United States Patent [19]

Comberg et al.

[11] Patent Number: 4,982,362

[45] Date of Patent: Jan. 1, 1991

[54] ELECTRON-BEAM RECORDING MEDIUM

[75] Inventors: Albert A. Comberg, Aachen; Thomas A. Welker, Roetgen, both of Fed. Rep. of Germany

[73] Assignee: U.S. Philips Corporation, New York, N.Y.

[21] Appl. No.: 886,574

[22] Filed: Jul. 16, 1986

[30] Foreign Application Priority Data

Jul. 20, 1985 [DE] Fed. Rep. of Germany ....... 3525994

[51] Int. Cl.$^5$ ............................................. G11C 13/00
[52] U.S. Cl. ................................... 365/118; 369/101; 250/327.2; 250/484.1
[58] Field of Search ............... 250/483.1, 484.1, 327.2; 369/101; 365/118, 128, 217

[56] References Cited

U.S. PATENT DOCUMENTS

| | | | |
|---|---|---|---|
| 3,054,961 | 9/1962 | Smith | 328/124 |
| 3,556,787 | 1/1971 | Letter | 250/327.2 |
| 4,360,571 | 11/1982 | Rabatin | 250/483.1 |
| 4,380,702 | 4/1983 | Takahashi et al. | 250/327.2 |
| 4,443,380 | 4/1984 | Yamazoe et al. | 252/301.16 |
| 4,651,220 | 3/1987 | Hosoi et al. | 250/327.2 |
| 4,689,277 | 8/1987 | Minagawa et al. | 250/483.1 |
| 4,700,071 | 10/1987 | Mori et al. | 250/327.2 |

FOREIGN PATENT DOCUMENTS

| | | | |
|---|---|---|---|
| 372855 | 6/1973 | U.S.S.R. | 365/128 |
| 1340322 | 12/1973 | United Kingdom | 250/484.1 |

OTHER PUBLICATIONS

H. E. Bishop, R. P. Henderson, P. Iredale and D. Pooley, "Information Storage Using Inhibited Cathodoluminescence." *Applied Physics Letters*, vol. 20, No. 12 (Jun. 15, 1972), pp. 504–506.

*Primary Examiner*—Constantine Hannaher
*Attorney, Agent, or Firm*—Norman N. Spain

[57] ABSTRACT

An electron beam recording medium with a coating, which is applied to a substrate, is sensitive to electron beam radiation and has an organic rare earth metal type phosphor, is suitable for the irreversible writing of information with low-intensity electron beams.

9 Claims, 1 Drawing Sheet

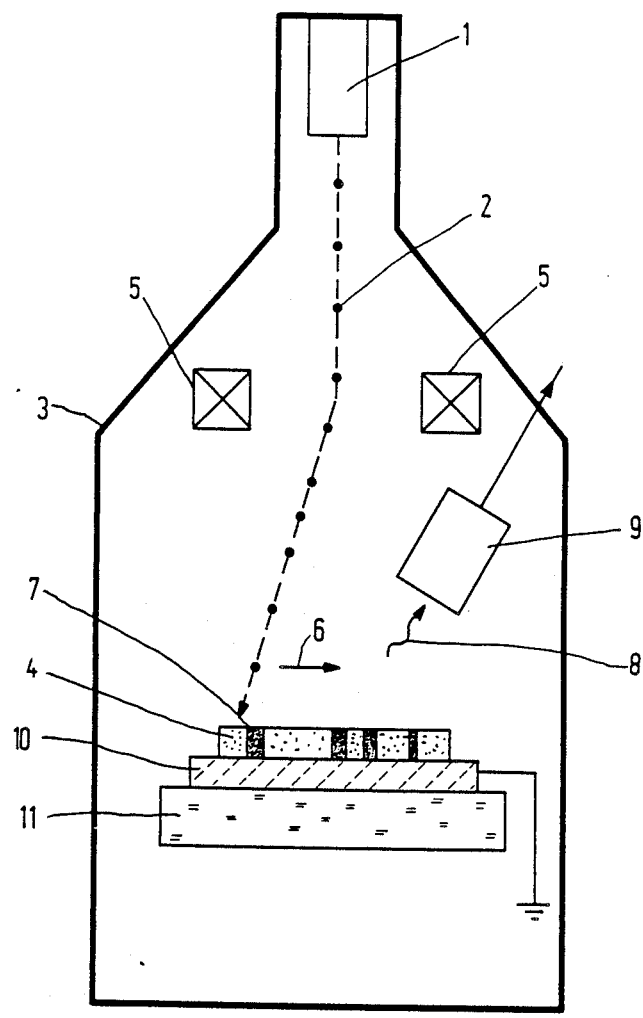

ELECTRON-BEAM RECORDING MEDIUM

BACKGROUND OF THE INVENTION

The invention relates to an electron-beam recording medium with a coating, applied to a substrate, which contains a phosphor and is sensitive to electron-beam radiation.

The electron beam-sensitive coating is also designated hereinafter as the "phosphor coating" or "storage coating" for the sake of simplicity.

A recording medium of the above-mentioned type is known from DE-OS No. 19 63 374. The phosphors mentioned herein are thallium-doped potassium iodide and manganese-doped potassium magnesium fluoride. When data is written with an electron beam, the phosphors luminesce; at the same time, defects are formed which extinguish the luminescence. These defects can be eliminated or healed by heating. This medium, therefore, is a recording medium for the reversible recording of data.

In the known recording medium the storage of data is based on the formation of areas of different degrees of radiation defects on the surface of the electron-luminescent phosphor, i.e. the thickness of the phosphor coating is to be selected in such a way that it is almost penetrated, but not quite by the electron beam which bombards the coating. Storage on the surface has the disadvantage that the stored information is sensitive to contact, weathering the other surface-damaging influences.

The use of phosphors based on halogenide crystals in electron beam recording media has the further disadvantage that these crystals are hygroscopic. This makes the production of phosphor-based recording media which is simple in principle somewhat more difficult, and care must be taken to ensure that the phosphors are protected against air humidity during subsequent use of the recording medium.

In addition, local defect concentration differences of the aforementioned type have a tendency to even out. This effect is presumably due to diffusion. The diffusion rate of the defects depends both on the concentration gradients of the defects in the crystals and on the temperature. It increases with both. The result of this is that there is a permanent tendency towards information loss. In the patent mentioned earlier, this effect which is particularly prominent at elevated temperature is intended after all as an erasure mechanism for the written information.

The intrinsic tendency of the phosphor type contained in the known recording medium to restore the chemical equilibrium by diffusion of accumulations of localized defects imposes a natural limit on the highest number of 0→1 items of information which can be written per unit surface. According to the above-mentioned patent, only $10^7$ bits of digital information are stored on a disc of $4\times 6$ mm$^2$.

DE-OS No. 30 32 611 describes organic rare earth metal salt type phosphors which are capable of emitting radiation when subjected to excitation by, among other things, electron bombardment and which are suitable, among other things, as photographic materials, picture-resolving materials or high-resolution materials, and as basic materials for the field of optoelectronics.

SUMMARY OF THE INVENTION

An object of the present invention is to create a recording medium for the irreversible writing of information and therefore for the recording of documents.

A further object of the invention is to create a recording medium in which the recording process involves not only the surface but the entire volume of the beam-sensitive coating.

Another object of the invention is to select phosphors for electron-beam recording medium which are not hygroscopic and do not have a tendency for the local defect concentration differences to even out.

Yet another object is to create a recording medium with increased information density.

According to the invention these objects are achieved by including in the electron beam-sensitive coating of the recording medium an organic rare earth metal type phosphor or employing an electron beam-sensitive coating which consists of such a phosphor.

During the investigations which led to the invention it was shown, in fact, that phosphors of this type, which are described in part in DE-OS No. 30 32 611, are already irreversibly destroyed with electron beam of low intensity.

In order to ensure that the organic rare earth metal type phosphor is completely destroyed by the electron radiation, the thickness of the radiation-sensitive coating is smaller than or equal to the depth of penetration of the electrons.

BRIEF DESCRIPTION OF THE DRAWING

The sole FIGURE of the drawing is a schematic of a read-write device of the invention employing the recording medium of the invention.

DETAILED DESCRIPTION OF THE INVENTION

The preferred phosphor used in the coating is a rare-earth metal salt of a carboxylic acid.

Examples of suitable rare earth metal salts of carboxylic acids are those known from DE-OS No. 30 32 611, such as the rare earth metals salts of aliphatic carboxylic acids, e.g. 2,4,6-octatrienic acid and 2,4,6,8-decatetraenic acid and their substitution products, aromatic carboxylic acids, e.g. m-methoxybenzoic acid, p-methoxybenzoic acid, m-chlorobenzoic acid, p-chlorobenzoic acid, p-bromobenzoic acid, dichlorobenzoic acid, p-ethoxybenzoic acid, m-nitrobenzoic acid, cuminic acid, (p-isopropylbenzoic acid), p-t-butylbenzoic acid, 4-benzoylbenzoic acid, 4-biphenyl carboxylic acid, phenylproprionic acid, 2-chloro-6-fluorobenzoic acid, α-bromo-p-toluic acid, isophthalic acid, terephthalic acid, trimellitic acid and their substitution products, polycryclic aromatic carboxylic acids, e.g. anthracene-9-carboxylic acid and anthraquinone carboxylic acid and their substitution products, heterocyclic carboxylic acid, e.g. 2-thiophene carboxylic acid, 3-thiophene carboxylic acid, nicotinic acid, picolinic acid, indole-5-carboxylic acid, pyridine-2,5-dicarboxylic acid, pyridine-3,4-dicarboxylic acid, 2-phenyl-4-quinolinic acid, quinaldinic acid and 5-methyl-2-thiopene carboxylic acid and substitution products of these acids, and α, β-unsaturated carboxylic acids, e.g. 3-indole acrylic acid, 4-imidazole acrylic acid, 3-(2-thienyl) acrylic acid, β-(3-pyridyl) acrylic acid, 2,3-bis (p-methoxyphenyl) acrylic acid, cinnamic acid, p-methyl cinnamic acid, α-methyl cinnamic acid, m-chlorocinnamic acid, m-bromocinnamic acid, p-chlorocinnamic acid, 3,5-dimethyloxycinnamic acid and 3,4 dihydroxycinnamic acid, and carboxylic acids such as Crocetine, Bixine and Azafrine and their substitution products.

In a further preferred embodiment the applied phosphor comprise the rare earth metal europium, terbium, cerium or thulium. The rare earth metals are preferably trivalent.

Especially preferred is europium cinnamate.

Other phosphors which can be used in accordance with the invention are phthalocyanines and porphyrins in which the central metal ion is a trivalent rare earth metal ion, preferably europium or terbium.

Rare earth metal chelates which, for example, contain $\beta$-diketones or carboxyl groups as the ligand are described in DE-OS No. 30 32 611 as being unsatable phosphors. Consequently, these phosphors, too, are applicable within the framework of the invention.

Europium-$\beta$-(3-pyridyl)-acrylate, europium sorbate and europium diphenylacetate are also eligible as phosphors for the recording medium of the invention, although they have a lower luminosity factor than, for example, europium cinnamate. In this case it is advisable to use light detectors with increased sensitivity when reading out the stored information.

The electron beam recording medium of the invention is produced by coating a substrate with a thin layer of an organic rare earth metal type phosphor. Metal plates, glass plates, fused silica plates, sapphire plates, transparent plastic foils or plates, for example, are suitable substrates.

In a preferred embodiment the substrate is made of an insulating material and is provided on the side facing the electron-beam sensitive coating, with a diverging electrode such as coating of a transparent, electrically conductive layer or an aluminum film. If substrates with sufficient electrical conductivity are chosen such as, for example, glasses made conductive by doping or metal plates, then the conducting electrode is not needed.

The phosphor coating is produced, for example, by sedimentation from a suspension of phosphor and organic solvent, e.g. ethanol or toluene. A practical thickness for the coatings thus produced is 1 to 5 $\mu$m.

To store information, the phosphor coating is irreversibly destroyed locally in respect to its original luminescence properties and is left at other places in its initial state. In this way the binary coding luminescent/non-luminescent as a function of location is obtained in the phosphor coating. Within certain limits a similar coding of the phosphor coating is also eligible. For this purpose the local destruction of the luminescence properties of the phosphor coating is made in gradations. Thus, for example, codings of the form luminescent/less luminescent/non-luminescent are obtained.

As already mentioned, the storage of information in the case of the recording medium described in DE-OS No. 19 63 374 is based on the formation of areas of different degrees of radiation defects on the surface of the phosphor. In contrast to this, the surface of the recording medium which is the subject of the present invention is of secondary importance in so far as the recording process in this case involves the entire volume of the phosphor coating. The surface is also inscribed in fact, but it is not the primary carrier of the information. The benefit which this brings is a reduced sensitivity to contact, weathering and other surface-damaging influences. Subsequent treatment of the surface can take place.

Furthermore, with the recording medium of the invention the radiation damage is localized down to molecular dimensions. Accordingly, there are no expansive crystal defects. The defect therefore is molecule-dependent. This applies to all the organic storage materials which can be used according to the invention. The outcome of this is that the above-mentioned limitations which apply to alkali halides and inorganic materials behaving similarly in this respect do not arise with the materials proposed in the present invention.

In the case of the recording medium as claimed by the present invention, the local resolving power and with it the information density is determined by the depth of penetration of the electron beam writing the information, which depends on the electron energy, and the diameter of the electron beam. Thus, for example, commercial scanning electron microscopes permit focusing of the electron beam down to 5 nm. Even if the electron beam were defocussed to double the diameter (10 nm), $25 \times 10^{10}$ bits could thus be stored on a storage area of $4 \times 6$ mm$^2$.

The limitation due to the depth of penetration can, as already mentioned, be avoided by appropriate specification of the coating thickness which for an electron energy of 30 kev, for example, is approx. 4 $\mu$m.

For the subsequent reading of the information stored in this way the phosphor coating is excited into luminescence and the light emitted is registered as a function of the location in the phosphor coating.

Preferred embodiments of the invention will be explained in greater detail below with the aid of the drawing and the following examples.

The one FIGURE presents a schematic diagram of a read-write device with a recording medium arranged inside it.

The function and the construction of the device and the recording medium are described below with reference to the drawing: An electron gun system 1 is used to generate and shape a writing and/or reading electron beam 2. Such electron gun systems are generally known and are much used in electron microscopes, cathode-ray tubes etc. The device itself consists of an evacuated container 3. For the purpose of scanning the storage layer 4 the electron beam is deflected line by line in the form of a raster over the storage layer either electrostatically or, as shown in the figure, magnetically by deflection coils 5. This is indicated by an arrow 6. The focusing plane for the electron beam is the storage layer 4. When the information is being written (with high electron beam intensity) the electron beam is blanked by a control grid, which in the case in question is present in the form of a Wehnelt cylinder in the electron gun system 1 itself, at the places where destruction of the phosphor coating 4 is not intended. The regions in which destruction by the electron beam takes place are indicated by 7 in the diagram.

The phosphor coating 4 is fully coded with information when one raster has been passed through. Subsequently, reading of the stored information takes place in a very similar manner, but with lower electron beam intensity, by line-by-line scanning of the phosphor coating 4. The luminescence signal 8 thus produced is recorded synchronously with the deflection of the electron beam by means of a photodetector 9 (photomultiplier). In order that the phosphor coating 4 does not become charged during the read or write process due to the electrons being applied, a conductive under-electrode 10 is provided between phosphor coating 4 and substrate 11 which serves to divert the charges. As already mentioned, it is also possible to dispense with such a diverting electrode when the substrate 11 itself is conductive and, by virtue of this property, has assumed the function of the diverting electrode. As a whole, such an arrangement is ideally embodied in a scanning electron microscope.

EXAMPLE 1

60 mg europium cinnamate phosphor is dispersed in 100 cm$^3$ toluene. Then, from the suspension thus produced a thin layer is precipitated by sedimentation on a thin glass substrate (5×5 cm$^2$) which on its sedimentation surface has been given a transparent, electrically conductive coating. Such coated glasses are available commercially under the name "Anellglas". The transparent layer serves as an under-electrode and, in the earthed state, prevents the phosphor coating from charging up during cathode ray excitation. After the sedimentation of the layer the solvent which is left is carefully removed by suction so that the layer is not damaged. The ultimate dry adhesion of the layer is achieved by subsequent drying at 50° C. to 70° C. The weight of the layer amounts to 4 mg per cm$^2$. The layer thickness is about 4 $\mu$m. The preparation of the storage coating has thus been completed and it is inserted in the sample chamber of a scanning electron microscope (Philips PSEM 500) for the purpose of storing information.

The method whereby the information is written is as follows:

With the aid of the electron beam of the scanning electron microscope, an area of 1×2 mm$^2$ of the storage layer is scanned line by line. By modulation of the electron beam intensity (on-off) the phosphor coating is successively, serially bombarded. In this process the electron beam intensity during the bombardment of the phosphor coating is dimensioned in such a way that the luminescence properties of the phosphor are irreversibly destroyed during the period of bombardment. The intensity of the electron beam amounts to $10^{-6}$ Joule/cm$^2$ whereby a complete (100%) destroyment of the luminescent properties was obtained. An intensity of $10^{-7}$ Joule/cm$^2$ the luminescent properties were destroyed for 50%.

In this way, a flat arrangement of contiguous regions is obtained in which the phosphor has been destroyed or has been retained with its original luminescent properties, as the case may be. The coating therefore receives the information as to the places at which the electron beam had a high or a low intensity. Subsequent reading of the information stored in this way takes place therefore as follows:

The phosphor coating modified by the writing operation is scanned line by line in the same way as during the burning-in of the information. This time, however, in contrast to the writing operation the intensity of the electron beam is not modulated. A low intensity of $10^{-8}$ Joule/cm$^2$ constant with time, is selected to that the phosphor is excited to luminescence, but it is made certain that no further destruction can take place. When the coating is scanned, therefor, luminescent light is emitted at the places of the coating where there has been no prior destruction. During the scanning the luminescent light is recorded as a function of time with a photo-multiplier (RCA type C30134A). This form of light detection is known to be extremely sensitive and can take place at high speed so that the speed of the scanning electron beam is determined largely by the decay time of the luminescence.

Another advantage is the use of the transparent under-electrode. It makes it possible to detect the luminescent light both from the underside of the substrate and from the coating side. It is also possible to dispense with the transparent under-electrode and, instead, to have the diverting electrode in the form of a reflecting aluminum film such as is conventionally used in cathode-ray tubes at the top of the coating. In this case, the luminescent light is detected only from the underside of the coating.

Because the speed of the scanning electron beam is constant with time, this method can be used to reproduce the information as to the places at which the phosphor coating was previously destroyed.

With the scanning electron microscope used as the example, ion spots of the size of 10 ($\mu$m)$^2$ were able to be obtained in this way. Therefore on a scanned surface area of 1×1 mm$^2$ it is possible to code approximately 300×300 points with luminescent/non-luminescent information. The storage density depends, on the one hand, on the diameter of the burning-in/reading electron beam and, on the other, on the homogeneity and thickness of the phosphor coating and on the depth of penetration of the electron beam which depends on the acceleration voltage.

With modern scanning electron microscopes, electron spot diameters of 5 nm can be achieved without difficulty. In this case the storage density is limited to $4 \times 10^{12}$ pixels/cm$^2$ by the electron beam diameter. Similar results were obtained with layers of other organic rare-earth metal type phosphors such as those mentioned earlier in the specification.

EXAMPLE 2

A phosphor coating is produced as described in Example 1 and the information is also written as in Example 1.

The information is read out in parallel, by total-area irradiation of the phosphor coating with a UV lamp and imaging of the luminescence bit pattern on a detector array.

EXAMPLE 3

A 2 mm thick polymethacrylate plate containing a 4 $\mu$m thick layer of europium cinnamate is scanned, as described in embodiment example 51 of DE-OS No. 30 32 611, with a focussed $Co_2$ laser with an intensity of $10^{-7}$ Joule/cm$^2$ and the information is written serially by "on-off" modulation of the laser intensity. Reading takes place as describe in Example 2.

EXAMPLE 4

Information is written into a luminescent polymethacrylate plate as in Example 3. Reading of the plate is achieved serially by scanning the plate with a UV laser with simultaneous detection of the luminescent light.

What is claimed is:

1. A method for recording and retrieving digital (binary coded) information by electron beam radiation comprising irradiating an electron beam sensitive recording element comprising a substrate provided with an electron beam sensitive coating comprising an organic rare earth metal phosphor having luminescent properties with an electron beam focussed on said sensitive coating and modulated in accordance with the information to be recorded thereby forming, at the irradiated spots of said coating, defects in which the luminescent properties of said phosphor are irreversibly destroyed, exciting said phosphor containing coating into luminescence and registering the amount of said luminescence as a function of its location in the phosphor containing electron beam sensitive coating thereby retrieving the thus recorded information.

2. A method according to claim 1 wherein the recorded information is retrieved by scanning the sensitive coating with an electron beam of an intensity too low to form said defects but sufficient to excite the phosphor into luminescence.

3. The method according to claim 1 wherein the recording and retrieving of information is carried out in a scanning electron microscope wherein an electron beam is produced focusable down to 5 $\mu$m.

4. The method of claim 1 wherein the thickness of the electron beam sensitive coating is smaller than or equal to the depth of penetration of the electrons.

5. A method according to claim 4 wherein the thickness of the electron beam sensitive coating is from 1-5 $\mu$m.

6. A method according to claim 1 wherein the phosphor used in the electron beam sensitive coating is a rare earth metal salt of a carboxylic acid.

7. The method according to claim 6 wherein the rare earth metal salt of a carboxylic acid is the salt of a rare earth metal selected from the group consisting of europium, terbium, cerium and thulium.

8. The method of claim 7 wherein the organic rare earth metal phosphor is europium cinnamate.

9. The method of claim 1 wherein the electron beam sensitive coating is provided on a substrate made of an insulating material which substrate is provided on a side facing the electron beam sensitive coating with a coating of a transparent, electrically conductive layer or of an aluminum film.

* * * * *